United States Patent
Gridnev et al.

(10) Patent No.: US 9,088,618 B1
(45) Date of Patent: Jul. 21, 2015

(54) SYSTEM AND METHODS FOR ENSURING FAULT TOLERANCE OF ANTIVIRUS PROTECTION REALIZED IN A VIRTUAL ENVIRONMENT

(71) Applicant: Kaspersky Lab ZAO, Moscow (RU)

(72) Inventors: Sergey N. Gridnev, Moscow (RU); Pavel N. Yarykin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/311,590

(22) Filed: Jun. 23, 2014

(30) Foreign Application Priority Data

Apr. 18, 2014 (RU) .................................. 2014115457

(51) Int. Cl.
*H04L 29/06* (2006.01)
(52) U.S. Cl.
CPC ............ *H04L 63/20* (2013.01); *H04L 63/1425* (2013.01); *H04L 63/1433* (2013.01)
(58) Field of Classification Search
CPC .. H04L 63/20; H04L 63/1425; H04L 63/1433
USPC .......................................................... 726/24
See application file for complete search history.

(56) References Cited

U.S. PATENT DOCUMENTS

| | | | | |
|---|---|---|---|---|
| 5,530,860 | A * | 6/1996 | Matsuura | 718/105 |
| 7,603,711 | B2 * | 10/2009 | Scheidell | 726/24 |
| 8,015,288 | B2 * | 9/2011 | Miyajima | 709/225 |
| 8,176,293 | B2 * | 5/2012 | Gaither et al. | 711/173 |
| 8,176,558 | B2 * | 5/2012 | Kuwamura | 726/24 |
| 8,307,443 | B2 * | 11/2012 | Wang et al. | 726/24 |
| 8,479,294 | B1 * | 7/2013 | Li et al. | 726/24 |
| 8,751,781 | B2 * | 6/2014 | Konetski et al. | 713/2 |
| 8,789,049 | B2 * | 7/2014 | Hutchins et al. | 718/1 |
| 2004/0098623 | A1 * | 5/2004 | Scheidell | 713/201 |
| 2005/0010693 | A1 * | 1/2005 | Sinclair et al. | 709/250 |

(Continued)

FOREIGN PATENT DOCUMENTS

WO    2009020611 A2    2/2009

OTHER PUBLICATIONS

CloudAV: N-Version Antivirus in the Network Cloud Jon Oberheide, Evan Cooke, Famam Jahanian Electrical Engineering and Computer Science Department University of Michigan, Ann Arbor, MI 48109 (jonojono, emcooke, famaml)@umich.edu.

*Primary Examiner* — David García Cervetti
(74) *Attorney, Agent, or Firm* — Arent Fox LLP; Michael Fainberg

(57) ABSTRACT

Disclosed are systems and methods for ensuring fault tolerance of antivirus protection realized in a virtual environment. An example method includes collecting, by a antivirus agent in a virtual machine, information about available security virtual machines that provide at least one or more resource-intensive methods of antivirus checking of programs running on the virtual machine; analyzing the collected information to determine a location of the virtual machine relative to the security virtual machines and determine priorities for each of the security virtual machines based on the location of the virtual machine relative; forming a list of the available security virtual machines according to the priorities of the security virtual machines to identify a primary security virtual machine; connecting the virtual machine to the primary security virtual machine; and requesting the primary security virtual machine to perform at least antivirus checking of one or more programs running on the virtual machine.

20 Claims, 5 Drawing Sheets

(56) References Cited

U.S. PATENT DOCUMENTS

| | | | |
|---|---|---|---|
| 2005/0034164 A1* | 2/2005 | Sano et al. | 725/91 |
| 2006/0070066 A1* | 3/2006 | Grobman | 718/1 |
| 2009/0007100 A1* | 1/2009 | Field et al. | 718/1 |
| 2009/0089879 A1* | 4/2009 | Wang et al. | 726/24 |
| 2010/0043073 A1* | 2/2010 | Kuwamura | 726/24 |
| 2010/0100961 A1* | 4/2010 | Scheidell | 726/24 |
| 2010/0115291 A1* | 5/2010 | Buer | 713/192 |
| 2010/0167727 A1* | 7/2010 | Madhavan et al. | 455/434 |
| 2010/0250877 A1* | 9/2010 | Gaither et al. | 711/162 |
| 2010/0257608 A1* | 10/2010 | Jeong et al. | 726/24 |
| 2011/0141124 A1* | 6/2011 | Halls et al. | 345/522 |
| 2011/0154325 A1* | 6/2011 | Terasaki | 718/1 |
| 2011/0243058 A1* | 10/2011 | Yamada | 370/315 |
| 2011/0321040 A1* | 12/2011 | Sobel et al. | 718/1 |
| 2012/0054458 A1* | 3/2012 | Hutchins et al. | 711/162 |
| 2012/0054486 A1* | 3/2012 | Lakkavalli et al. | 713/156 |
| 2012/0069131 A1* | 3/2012 | Abelow | 348/14.01 |
| 2012/0117611 A1* | 5/2012 | Wookey | 726/1 |
| 2012/0137292 A1* | 5/2012 | Iwamatsu et al. | 718/1 |
| 2012/0144489 A1* | 6/2012 | Jarrett et al. | 726/24 |
| 2012/0151209 A1* | 6/2012 | Visnyak et al. | 713/166 |
| 2012/0167089 A1* | 6/2012 | Vermande et al. | 718/1 |
| 2012/0178488 A1* | 7/2012 | Jonker et al. | 455/517 |
| 2013/0024862 A1* | 1/2013 | Lim et al. | 718/1 |
| 2013/0067470 A1* | 3/2013 | Chen et al. | 718/1 |
| 2013/0089025 A1* | 4/2013 | Titcombe et al. | 370/328 |
| 2013/0111470 A1* | 5/2013 | Bozek et al. | 718/1 |
| 2013/0117836 A1* | 5/2013 | Shieh | 726/12 |
| 2013/0139159 A1* | 5/2013 | Eidus et al. | 718/1 |
| 2013/0179289 A1* | 7/2013 | Calder et al. | 705/26.3 |
| 2013/0179574 A1* | 7/2013 | Calder et al. | 709/226 |
| 2013/0179881 A1* | 7/2013 | Calder et al. | 718/1 |
| 2013/0179894 A1* | 7/2013 | Calder et al. | 718/104 |
| 2013/0179895 A1* | 7/2013 | Calder et al. | 718/104 |
| 2013/0223424 A1* | 8/2013 | Jiang et al. | 370/338 |
| 2013/0254523 A1* | 9/2013 | Konetski et al. | 713/2 |
| 2013/0282653 A1* | 10/2013 | Tandra Sistla et al. | 707/610 |
| 2013/0283092 A1* | 10/2013 | Das et al. | 714/3 |
| 2013/0312096 A1* | 11/2013 | Larsen et al. | 726/24 |
| 2013/0347131 A1* | 12/2013 | Mooring et al. | 726/29 |
| 2014/0157259 A1* | 6/2014 | Dow et al. | 718/1 |
| 2014/0157269 A1* | 6/2014 | Dow et al. | 718/1 |
| 2014/0189050 A1* | 7/2014 | Rijsman et al. | 709/217 |
| 2014/0189685 A1* | 7/2014 | Kripalani | 718/1 |
| 2014/0196039 A1* | 7/2014 | Kottomtharayil et al. | 718/1 |
| 2014/0245430 A1* | 8/2014 | Vipat et al. | 726/17 |
| 2014/0304819 A1* | 10/2014 | Ignatchenko et al. | 726/24 |
| 2014/0337836 A1* | 11/2014 | Ismael | 718/1 |

* cited by examiner

SYSTEM AND METHODS FOR ENSURING FAULT TOLERANCE OF ANTIVIRUS PROTECTION REALIZED IN A VIRTUAL ENVIRONMENT

CROSS-REFERENCE TO RELATED APPLICATIONS

The present disclosure claims benefit of priority under 35 U.S.C. 119(a)-(d) to a Russian Application No. 2014115457 filed on Apr. 18, 2014, which is incorporated by reference herein.

TECHNOLOGY FIELD

The present disclosure relates generally to the field of computer security and, more specifically, to a system and method for ensuring fault tolerance of antivirus protection realized in a virtual environment.

BACKGROUND

Virtual machines have become very widespread. A virtual machine (VM) is a software environment which ensures the working within one physical ("real") machine (such as a computer or server) of another real computer. Several virtual machines can operate at the same time on one physical machine, which is also known as the "host machine", thereby forming a virtual computer environment. In this case, the virtual machines utilize the same computing resources of the host machine, control of which resources is provided by a monitor of the virtual machines.

The monitor of the virtual machines, also known as a hypervisor, enables the simultaneous working of the virtual machines deployed on the host machine, and also controls the computing resources of the host machine, allocating them among the virtual machines. Thus, the hypervisor allocates a certain number of resources during the deployment of each VM in the virtual environment. Each VM then uses the allocated resources both for the working of its own operating system and to perform the tasks of the user. Moreover, the hypervisor can provide the virtual machines with means of communication and interaction with each other, such as network connections, as if they were different physical machines. Thus, it is possible to create a virtual local-area network on the host machine. Moreover, the capabilities of the hypervisor make it possible to impose various limits on the virtual machines, such as a limit on connecting to the Internet. In this case, a local-area network is formed that is isolated from the external network, which, for example, makes it possible to ensure the security of this network or of the virtual machines, while the communication with the external network occurs through the hypervisor or a specially designated VM. This variant is useful when creating corporate networks whose virtual machines may contain confidential information.

A virtual machine, like any physical computer device (such as a personal computer), is also vulnerable to malicious software. Consequently, there is a need to use an antivirus system for their protection, which is designed to detect and remove malicious software. At the same time, the realization of an antivirus system in a virtual environment has some special features. These are due to the fact that virtual machines do not have a physical hard disk drive (HDD), since this is emulated in the central processing unit of the host machine. Therefore, the input/output (I/O) operations carried out on virtual machines result in substantial burdening of the host machine processor and may even result in prolonged hanging of both of the VM when performing tasks, as well as the host machine itself. Hence, there is a need to reduce the number and volume of the I/O operations performed on the virtual machines. For this reason, a distributed antivirus system is created for implementing an antivirus system to protect a virtual environment, one of the advantages of which being a substantial decrease in the number of disk operations.

Such an antivirus system may be a distributed antivirus system that includes, for example, a virtual machine carrying out the tasks of antivirus checking (also known as a security virtual machine (SVM)), and agents located on each VM in the network and performing functions to enable the working of the SVM (transfer of data, detection and blocking of access to various objects residing on the VM).

However, if a very large number of VMs are deployed within a single host machine, there is also a continual growth in the workload of the SVM, which may result in its failure. Furthermore, scenarios are also possible where the connection between VM and SVM may be broken. Therefore, the antivirus protection in the context of a distributed approach to protection of a virtual environment, especially that of virtual machines, becomes difficult if not impossible. Therefore, for an effective use of the benefits of a distributed antivirus system of protection, it is necessary to ensure the condition of fault tolerance for such antivirus protection in the conditions of a virtual network infrastructure (environment).

Therefore, even though some current antivirus systems are aimed at solving the problem of optimizing the use of the host machine resources, they have one common drawback. The drawback is related to the lack of an assured fault tolerance of the antivirus protection in the conditions of a virtual environment.

SUMMARY

Disclosed are various aspects of systems, methods and computer program products for ensuring fault tolerance of antivirus protection of virtual machines. One technical result of the disclosed aspects is in ensuring fault tolerance of antivirus protection realized in a virtual environment using an antivirus agent residing on a virtual machine and connected to the primary security virtual machine, in case of failure in a connection to the primary security virtual machine. This technical result is achieved by connecting the antivirus agent to the next security virtual machine in a queue of available security virtual machines.

In one aspect, an example method includes collecting, by a antivirus agent in a virtual machine, information about available security virtual machines that provide at least one or more resource-intensive methods of antivirus checking of programs running on the virtual machine; analyzing the collected information to determine a location of the virtual machine relative to the security virtual machines and determine priorities for each of the security virtual machines based at least in part on the location of the virtual machine relative; forming a list of the available security virtual machines according to the priorities of the security virtual machines to identify a primary security virtual machine; connecting the virtual machine to the primary security virtual machine; and requesting the primary security virtual machine to perform at least antivirus checking of one or more programs running on the virtual machine.

In one aspect, the information collected about the security virtual machines may include one or more of: a unique identifier of a hypervisor on which a security virtual machine is installed; a type of the hypervisor; a number of virtual machines attended by the security virtual machine; and an IP address of the security virtual machine.

In one aspect, determining priorities may be further based on one or more of: availability of first information about a security virtual machine in the virtual machine; an affiliation of the security virtual machine with a same hypervisor on which the virtual machine is installed; availability of second information about the virtual machine in the security virtual machine; a type of a hypervisor on which the security virtual machine is operating; a busy status of the security virtual machine determined based on a first number of virtual machines connected to the security virtual machine and computing resources allocated to the security virtual machine.

In one aspect, connecting the virtual machine to the primary security virtual machine may further include: determining that a successful connection is established with the primary security virtual machine; storing a unique identifier of the primary security virtual machine; and monitoring a status of the successful connection.

In one aspect, connecting the virtual machine to the primary security virtual machine may further include: determining that a successful connection is established not with the primary security virtual machine but with a different security virtual machine on the list of the security virtual machines; performing a repeat attempt to connect to the primary security virtual machine; and if the repeat attempt fails: connecting to the different security virtual machine; and storing a unique identifier of the different security virtual machine as a new primary security virtual machine for the virtual machine.

In one aspect, connecting the virtual machine to the primary security virtual machine may further include: determining a failure in a connection to the primary security virtual machine; determining whether the list of the security virtual machines is up to date based on a time of a last updating of the list of the security virtual machines; if the list of the security virtual machines is not up to date, updating the list of the security virtual machines; and attempting to connect to the security virtual machines according to the list of the security virtual machines until a successful connection is established with the primary security virtual machine or until a new primary security virtual machine is identified.

In one aspect, the method may further include maintaining the list of the security virtual machines up to date by periodically repeating the collecting, the analyzing, and the forming.

In one aspect, the method may further include determining a failure in a connection to the primary security virtual machine; and attempting to connect to the security virtual machines according to the list of the security virtual machines until a successful connection is established with the primary security virtual machine or until a new primary security virtual machine is identified.

In another aspect, an example system for ensuring fault tolerance of antivirus protection realized in a virtual environment, including a processor configured to collect, by the virtual machine, information about available security virtual machines that provide at least one or more resource-intensive methods of antivirus checking of programs running on the virtual machine; analyze the collected information to determine a location of the virtual machine relative to the security virtual machines and determine priorities for each of the security virtual machines based at least in part on the location of the virtual machine relative; form a list of the available security virtual machines according to the priorities of the security virtual machines to identify a primary security virtual machine; connect the virtual machine to the primary security virtual machine; and request the primary security virtual machine to perform at least antivirus checking of one or more programs running on the virtual machine.

In a further aspect, an example computer program product, stored on a non-transitory computer-readable storage medium is provided, includes computer-executable instructions for ensuring fault tolerance of antivirus protection realized in a virtual environment, including instructions for collecting, by a antivirus agent in a virtual machine, information about available security virtual machines that provide at least one or more resource-intensive methods of antivirus checking of programs running on the virtual machine; analyzing the collected information to determine a location of the virtual machine relative to the security virtual machines and determine priorities for each of the security virtual machines based at least in part on the location of the virtual machine relative; forming a list of the available security virtual machines according to the priorities of the security virtual machines to identify a primary security virtual machine; connecting the virtual machine to the primary security virtual machine; and requesting the primary security virtual machine to perform at least antivirus checking of one or more programs running on the virtual machine.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for ensuring fault tolerance of antivirus protection of virtual machines deployed in a virtual infrastructure. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In describing the figures, the following approach has been adopted for the numbering: when the number of an object is encountered in the description that lacks a letter part, the consideration under discussion pertains to all objects containing the given number part. For example, "hypervisor 110" means that the discussion has in view hypervisors with numbers 110a, 110b . . . 110n. But if the description of an object uses the full numbering, then the description pertains to the specific object in the figure (for example, hypervisor 110a or virtual machine 140aa).

Figure 1:
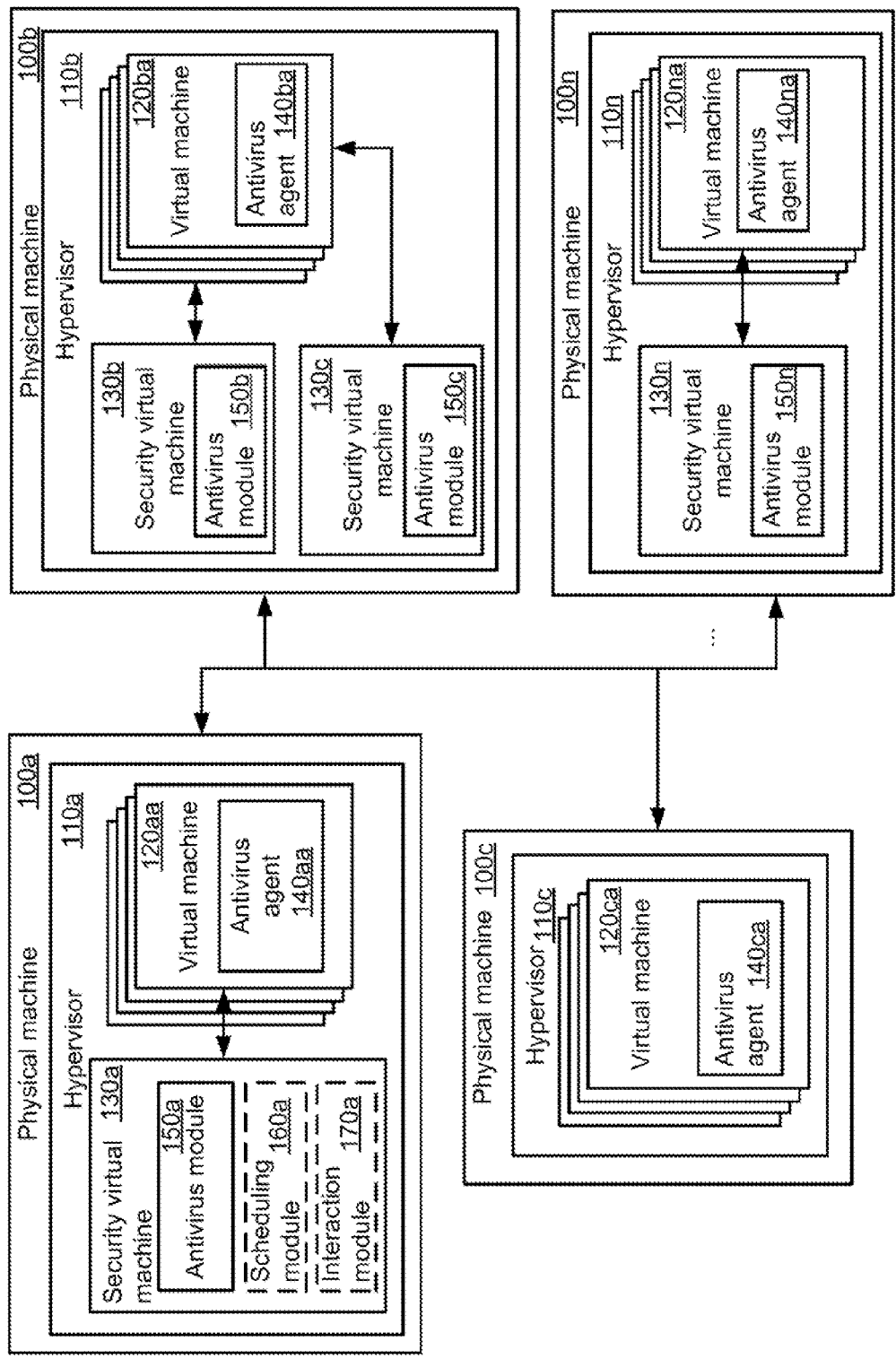
FIG. 1 shows an example virtual infrastructure for which a system of ensuring fault tolerance of antivirus protection of virtual machines is provided.

FIG. 1 shows an example virtual infrastructure in accordance with one aspect of the invention. A virtual infrastructure includes a number of virtual machines 140 and the systems of communications and control thereof. The number of virtual machines may be, for example, several virtual machines (e.g., between 1 and 10) or even hundreds. The presence of a large or even enormous number of virtual machines (VMs) requires a corresponding volume of computing resources. Therefore, the virtual machines may be deployed on a single physical machine (such as the physical machine 100a) or on a cluster of physical machines 100a-100n. Each physical machine 100 includes at least a hypervisor 110, configured to control the VMs deployed on that same physical machine. Control may refer to the managing and distributing of the computing resources of the physical machine among the VMs. The hypervisor is essentially a "shell" between the physical machine and the VMs deployed on that physical machine. For example, the physical machine 100a includes a hypervisor 110a which manages the computing resources of the physical machine 100a and controls the working of the VMs 120aa-120an.

In one aspect, the antivirus protection of the virtual machines is realized by placing an antivirus agent 140 on each virtual machine 120, deploying a security virtual machine (SVM) 130 on each physical machine 100, and establishing a connection between the antivirus agents 140 and the SVM 130. The SVM 130 may be the same as the VMs 140, but having its specific functional tasks.

In this aspect, the antivirus agent 140 is a module configured to perform the function of continuous antivirus protection of the virtual machine 120 by monitoring the events occurring in the operating system of the virtual machine 120. Examples of these events include, but not limited to, system calls, read and write operations, and opening and closing of a file, that is, various activities of applications and file access. Antivirus agent 140 identifies among the monitored events those that are suspicious or forbidden, and also analyzes suspicious events and blocks both the forbidden events themselves and the objects performing these forbidden events. Suspicious events are events that, during analysis, show malicious behavior of applications, for example, the removal of an executable file after its execution is a suspicious event. The analysis of suspicious events (activities) may be performed by using the existing functional capability of the antivirus agent 140. Functional capability refers to different methods of antivirus checking, which may not be laborious methods from the standpoint of using computing resources, such as the processor and the hard disk. Examples of such methods include, but not limited to, the method of application control by using predefined rules or the intrusion prevention method (host intrusion prevention system (HIPS)). The resource-intensive (e.g., time and/or resource consuming methods) antivirus checking tasks may be sent by the antivirus agent 140 to the security virtual machine (SVM) 130. Examples of resource-intensive antivirus checks tasks, include, but not limited to:

the method of signature analysis (such as on-demand scanning and on-access scanning);

methods using a comparison approach (such as whitelisting, blacklisting, web-check, and mail-check);

methods allowing a detailed analysis of an object or data, such as with the aid of an expert system, forming the basis for an analysis of events which have occurred or the emulation of program code.

In one example aspect, the security virtual machine 130 includes an antivirus module 150 for performing resource-intensive antivirus check tasks. In turn, the antivirus module 150 includes at least one scanning module and an antivirus database (not shown in FIG. 1). The scanning module can perform antivirus check tasks using at least one of the antivirus check methods listed above. The antivirus database includes various signatures of malicious objects and provides them to the scanning module. The result of the antivirus check is sent by the SVM 130 to the antivirus agent 140 which relayed the given task.

In one example aspect, the antivirus module 150 may also include a number of different modules enabling an optimized workload on the computing resources of the physical machine. Examples of such modules may be a module for updating the antivirus databases and a module for control of license agreements. Workload optimization in one example aspect refers to the placement of these modules within the antivirus module 150, since the previously indicated modules are on the VM side. In one example aspect, the module for updating the antivirus databases may update both the versions of the antivirus databases used in the scanning directly by the antivirus module 150 and those used by the antivirus agents 140.

Furthermore, since the SVM 130 has concurrent connection to several VMs 120, for example the SVM 130a is connected to VMs 120aa-120an, the SVM 130 may also include a scheduling module 160a. The scheduling module 160a is configured to form the queue for performing the antivirus check by the antivirus module 150 in cases when more than one antivirus check task is received or when the antivirus check is being performed by various antivirus check methods. Yet another function of the scheduling module 160a may be to designate the priority of antivirus check tasks when forming the queue. The queue may be formed both in accordance with the time of reception of the antivirus check tasks and in accordance with a prioritization of the antivirus check tasks. Priorities may be assigned to the antivirus check tasks in accordance with the required antivirus check methods; for example, if a check is required by a method of "on access scanning", then the priority is one, but if a check is needed by the method of "on demand scanning" then it has a second priority.

In yet another aspect, the SVM 130 may include an interaction module 170a. The interaction module 170a allows the SVM 130 to receive information from the hypervisor, interact with other SVMs 130 and dispatch information for a VM. The hypervisor 110 provides information including at least information about the VMs which are being controlled thereby, and information on the current workload on the computing resources of the physical machine 100 which are provided to the SVM 130. During the interaction of the security virtual machines 130 with each other, there is an exchange of information which include information at least on the location of the SVMs, their connections to the VMs, and the workload at the current moment in time. The information dispatched for the VMs includes information at least on the location of the SVM, its current connections with the VMs and the workload at the current moment in time. The dispatching of information may occur constantly with a set frequency, for example every 5-10 seconds.

In an example aspect, each hypervisor 110 may include only one SVM, which makes it possible to achieve the best working of both the SVM 130 itself and the physical machine 100. Thus, for example, the hypervisor 110a includes only the SVM 130a. In an example aspect, one hypervisor, such as hypervisor 100b, may have two SVMs 130b and 130c or more. Also, for example, one hypervisor may have no SVM, as for hypervisor 100c.

Therefore, one of the critical tasks confronting the antivirus protection of virtual machines is to ensure an uninterrupted connection of the antivirus agent and the security virtual machine, and also to perform the selection of a preferred SVM in the primary connection of the antivirus agent to the SVM.

Figure 2:
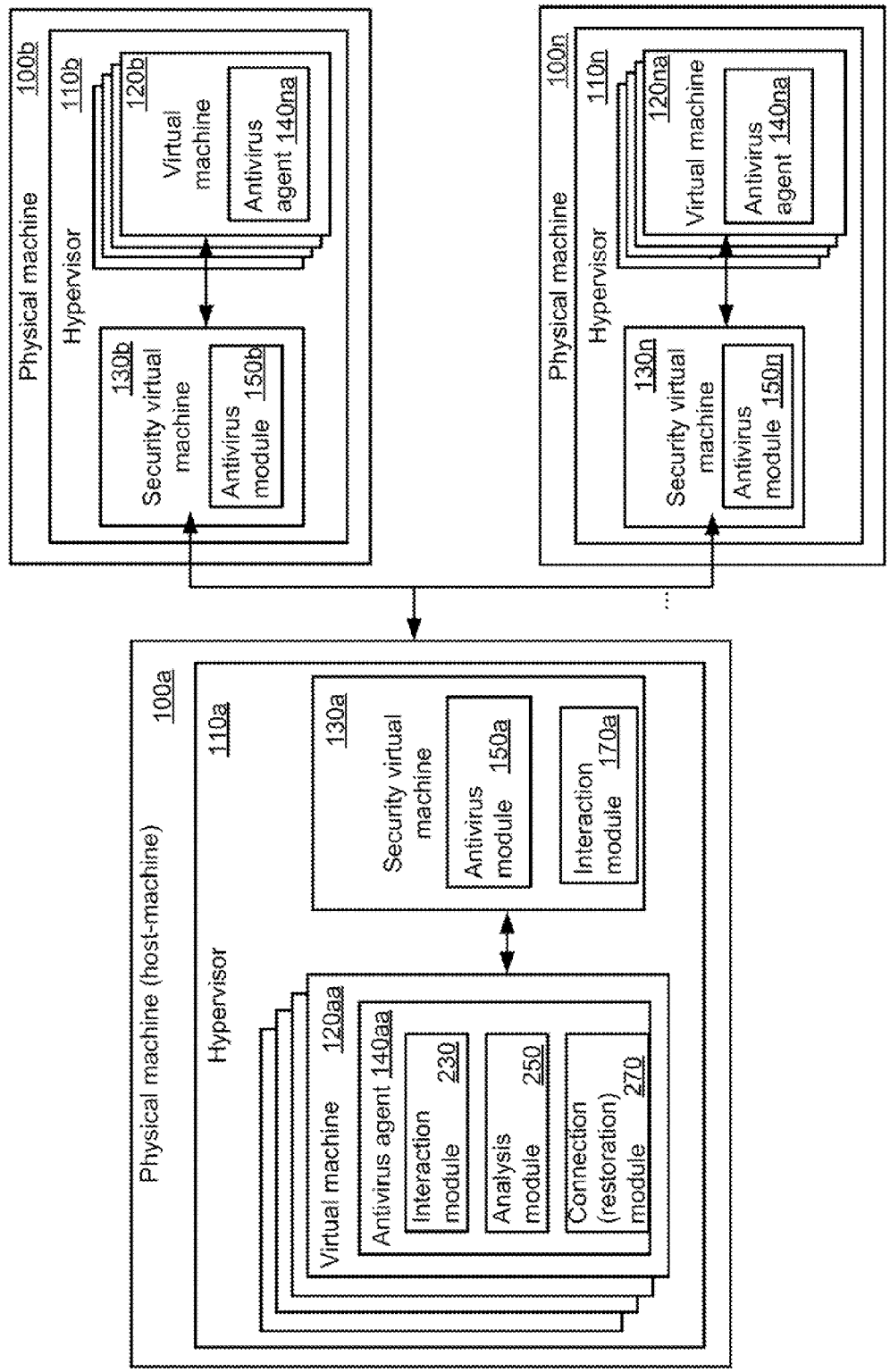
FIG. 2 is a block diagram of an example of the location and interaction of the components of the system of ensuring fault tolerance of antivirus protection of virtual machines in conditions of a virtual infrastructure.

FIG. 2 shows the location and interactions of the components of an example system of ensuring fault tolerance of antivirus protection of a virtual machine 100aa deployed in a virtual infrastructure, e.g., on the physical machine 100a. The system of ensuring fault tolerance of antivirus protection of the virtual machine (hereinafter, the fault tolerance system) may be realized under the condition that the virtual infrastructure is deployed on at least two physical machines, in which case each physical machine possesses its own SVM. The more physical machines there are, more specifically the more SVMs that are included in the virtual infrastructure, the better will be the fault tolerance ensured of antivirus protection of each individual virtual machine. In one example aspect, one physical machine may include two (or more) SVMs.

The fault tolerance system is discussed herein in relation to only one VM 120aa located in the virtual infrastructure, however, this system may also be realized for the other VMs located in this same virtual infrastructure.

In another example aspects, the fault tolerance system may include at least an interaction module 230, an analysis module 250 and a connection module 270, which are located at the antivirus agent 140aa. The interaction module 230 is configured to collect information on the available SVMs residing in the virtual infrastructure. The analysis module 250 is configured to analyze the information about the SVMs, during which it determines the priority of each SVM, and forms a list of available SVMs ordered in terms of a given priority of each SVM. The connection module 270 is configured to select the primary SVM with subsequent connection and, upon identifying a failure in the connection to the primary SVM, make a connection to another SVM on the list of available SVMs.

In one example of the operation of the fault tolerance system for the VM 120aa, at the start of the operation, the antivirus agent 140aa installed on the VM 120aa, with the aid of the interaction module 230, collects information about the available SVMs 130 located in the virtual infrastructure. During the operation, each SVM 130 with the aid of the interaction module 170 dispatches information with a certain frequency, for example every 10 seconds. The information dispatched may include at least the unique identifier of the hypervisor 110 on which the SVM 130 is installed, the type of hypervisor 110 (such as XenServer, VMWare or Hyper-V Server), the number of VMs attended by the SVM 130 at the instant of dispatching the packets, and the IP address (internet protocol address used to identify the node in the network and to determine the routing). Furthermore, the information dispatched may also include some supplemental information, such as a port number. The collecting of information by the interaction module 230 takes place for a certain time (such as 10 seconds). The time may be set either when the antivirus agent 140aa is initiated or by default. The interaction module 230 then sends the collected information to the analysis module 250. In turn, the analysis module 250 performs an analysis of the collected information in order to determine the location of the VM 120aa in the virtual infrastructure (environment) relative to the SVMs 130 and form the list of available SVMs 130. During the analysis of each SVM 130 the analysis module 250 establishes a priority from the standpoint of an optimal connection of the VM 120aa to the SVM 130. In determining the priority of each SVM 130, one or more of the following prioritization criteria may be used:

the presence of information in the VM about the SVM to which it needs to connect;
the affiliation of the SVM with the same hypervisor on which the VM of the corresponding antivirus agent is installed;
the presence of information in the SVM about the VM on which the antivirus agent is installed;
the type of hypervisor on which the SVM is operating;
the busy status of the SVM.

Each prioritization criterion may have its own "weight". Therefore, a counting (summation) of the weight values is performed during the analysis of the collected information and the priority is established in accordance with the obtained sum (the higher the sum, the higher the priority). Thus, the analysis module 230aa forms a list of available SVMs according to the established priorities, where the higher the priority of the SVM 130, the higher its place will be on the list of available SVMs. Consequently, the first SVM on the list of available SVMs is the most optimal SVM 130 for the subsequent connection and later interaction therewith.

In one example aspect, the prioritization criteria may be rated. In this case, the analysis of the available SVMs 130 may take place in stages, and the maximum number of stages depends on the number of prioritization criteria. Since in each stage only one prioritization criterion is considered, each successive stage may be performed only if the prioritization criterion with the largest rating was inadequate to form the list of available SVMs.

In another example aspect, a mixed calculation may be used in which a portion of the criteria is used for ranking of blocks of SVMs and other criteria are used to calculate priority of available SVMs within each block. In a special case, all available SVMs may be separated in a primary block (for example, containing SVMs located on the same hypervisor that VM) and a "reserve" block that contains all other available SVMs. In this case, the list of available SVMs may also contain information on the respective blocks and respective SVMs contained therein.

The analysis module 230aa then sends to the connection module 250aa the resulting list of available SVMs. The connection module 250aa makes an attempt to connect to the SVMs on the list according to their sequence, e.g., at first to the first SVM on the list and, if the connection does not go through, then to the next SVM on the list. After a successful connection to a SVM, such as the SVM 130a, the connection module 270 stores the unique identifier (such as the IP address) of that SVM. Thus, this SVM 130a becomes the primary SVM for the given VM 120aa. In the event of loss of communication with the primary SVM, the connection module 270 may again connect by using the stored unique identifier obtained for the primary SVM.

In one example aspect, if the SVM with which the connection is made is not the first on the list of available SVMs, the connection module 270 after a certain time repeats the attempt to connect with the first SVM on the list, and after which it designates the primary SVM for the VM.

In some aspects, after forming the list of available SVMs the analysis module 250 together with the interaction module 230 maintains this list in an up-to-date form. For example, the interaction means 230 collects information from time to time (for example, at intervals of 2 minutes). The analysis module 250 then analyzes the new information obtained and if necessary makes changes to the list of available SVMs. The changes may be related either to the adding of new available SVMs or to a change in the sequence of the already available SVMs according to altered priorities. For example, if on the basis of the information received, it is determined that the SVM coming second on the list has a greater workload at that moment, while the third SVM is idle, the analysis module 250 rearranges their places in the list.

Upon discovering a failure in the connection between the antivirus agent 140*aa* installed on the VM 120*aa* and the antivirus module 150*a* installed on the SVM 130*a*, the connection module 270 makes a connection with the next SVM 130 on the list of available SVMs. In some further aspects, the connection module 270, before connecting to the next SVM on the list of available SVMs, may also make another connection to the primary (first) SVM and if the connection fails again it makes a connection to the next SVM on the list. A failure in a connection may occur for one or more of the following reasons:
  lack of access to the SVM;
  excess workload of the SVM, for example, the time to process a request for the performance of an antivirus task has taken longer than the waiting time;
  network problems in packet transport; and
  spontaneous malfunction of the SVM itself.

In the event that no connection is made to the next SVM on the list of available SVMs (for example, because of excess workload of the SVM), the connection module 270 makes connections to the SVMs appearing further down on the list until a connection is made with an available SVM. This SVM is a temporary SVM, and after the working of the primary SVM is restored the connection module 270 makes a connection thereto. In some example aspects, detecting the restoration of the primary SVM is performed by a periodic polling of the available SVMs in the course of the above-described information collecting.

In one example aspect, the portion of the list of available SVMs can be combined into a block. In this case, the connection module 270 may randomly choose for connecting a temporary SVM from the entire block of available SVMs taking into account previously counted "weights" assigned to each SVM based on the information on this SVM. This will help distribute load on the VM previously connected to the primary SVM, which refused to work on the "reserve" (temporary) SVM more evenly, and thus avoid overloading the temporary SVM.

In one example aspect, if the VM is connected to a nonprimary (e.g., temporary) SVM, changes may be made in the interaction of the antivirus agent 140 of the given VM and the antivirus module 150 installed on the nonprimary SVM. The changes may be related both to the performance of the antivirus check tasks and the information provided by the VM for the SVM. For example, the SVM may perform not all types of antivirus check, but only some of them. Thus, the SVM may be prohibited from doing a signature analysis, since a signature analysis requires working with resources allocated by the physical machine to the installed VM, while the SVM installed on another physical machine does not have information as to the workload for said computing resources. The information sent from the VM to the SVM may be not only the address of the location of the object on the hard disk that needs to be checked, but also the entire object for the SVM to check.

In yet another example aspect, a changing of the primary SVM may be made. In this case, the unique identifier may be changed. An example of the need to change the primary SVM is when the VM migrates to a different physical machine.

In one example aspect, the virtual infrastructure may include a SVM located on a physical machine configured only for the working of the given SVM. In this case, such a SVM may be the primary backup SVM. Then this backup SVM appears second on the list of available SVMs formed by each antivirus agent 140.

Figure 3:
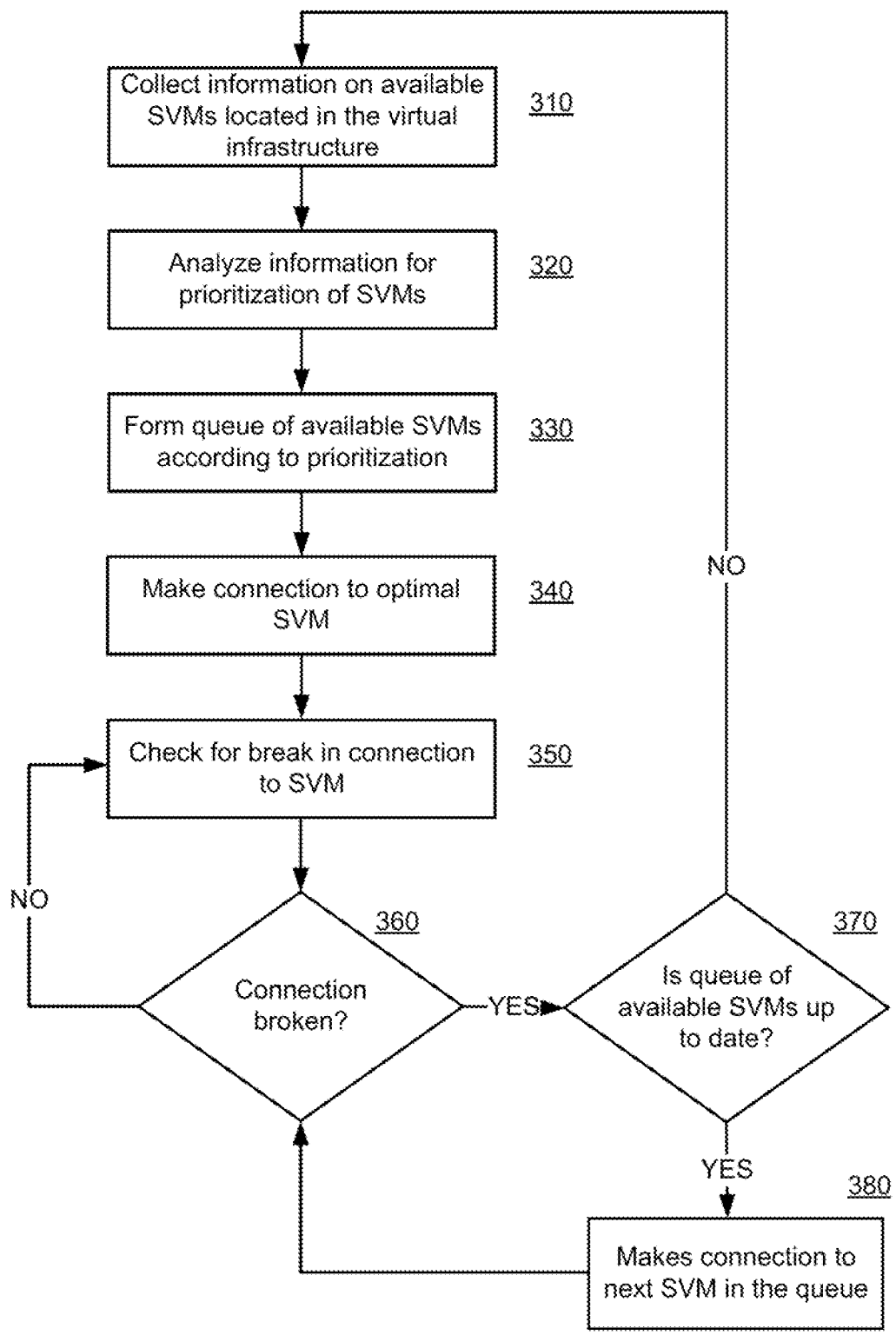
FIG. 3 is a flowchart of an example method of ensuring fault tolerance of antivirus protection in conditions of a virtual infrastructure.

FIG. 3 is a flowchart of an example method of ensuring fault tolerance of antivirus protection in conditions of a virtual environment. In step 310, with the aid of the interaction module 230, information is collected about the available SVMs 130 located in the virtual infrastructure. The information collected about each SVM 130 may include one or more of: information about the unique identifier of the hypervisor 110 on which the SVM 130 is installed, the type of hypervisor 110 (such as XenServer, VMWare or Hyper-V Server), the number of VMs attended by one SVM 130 or another at the instant of dispatching the packets, and the IP address of the SVM. The interaction module 230 then sends the information collected to the analysis module 250. In turn, in step 320, the analysis module 250 makes an analysis of the information obtained. The analysis includes determining the location of the VM relative to the SVMs and establishing the priority of each SVM about which information has been received, according to prioritization criteria. The prioritization criteria may include the criteria given in the description of FIG. 2. In step 330 the analysis module 250 forms a list of available SVMs, on which the SVM is placed according to the established priorities. Thus, the higher the SVM on the list of available SVMs, the higher its priority and consequently the more optimal the SVM for the connection. The analysis module 250 then sends the formulated list of available SVMs to the connection module 270. In step 340 the connection module 270 makes an attempt to connect to the available SVMs according to their sequence on the list of available SVMs. Thus, the SVM appearing first on the list of available SVMs is the most optimal SVM, so in the event of a successful connection to the first SVM on the list the connection module 270 stores the unique identifier of that SVM and in step 350 a control of the connection is performed. Otherwise, if a connection has been made with the second or lower SVM on the list, the connection module 270 again connects to the first SVM on the list and only thereafter connects to the next SVM and saves the unique identifier. After saving the unique identifier, the given SVM becomes the primary SVM for the corresponding VM, e.g., for the VM where the antivirus agent, and thus the fault tolerance system, has established communication with the SVM. The unique identifier allows the fault tolerance system to not forget the primary SVM and in the event of malfunction in the connection to perform a restoring of communications with the primary SVM. Furthermore, if a failure is found in the connection with the primary SVM in step 360, the connection module 270 in step 370 checks the list of available SVMs to make sure it is up to date. This is checked from the standpoint of the time of the last updating of this list of trusted SVMs. A time limit may be configured, either when setting up the fault tolerance system or by default. If the list is found to not be current, the connection module 270 sends a request to the interaction module 230, which in turn updates the list of available SVMs according to the steps described above. Otherwise, if the list of available SVMs is current, the connection module 270 in step 380 makes a connection of the antivirus agent to the next SVM in the queue, for example, until a connection is identified with the primary SVM, or until a new primary SVM is identified. This ensures a stable working of the antivirus protection of the virtual machine in conditions of a virtual infrastructure.

In one example aspect, the analysis module 250 always maintains the list of available SVMs in an up to date form by periodically collecting information and then analyzing it, so that, when necessary, changes are made in the list of available SVMs on the basis of said information. The changes may include adding new available SVMs or changing the sequence itself of the already available SVMs according to altered priorities. In this aspect, step 370 is skipped, and if a failure is detected in the connection step 380 is performed at once.

Furthermore, if the virtual machine migrates to a different physical machine, the antivirus agent 140 of the given virtual machine may determine a new primary SVM. This is due to the fact that, upon analyzing the information obtained from the SVMs, the order of the SVMs changes on the list of available SVMs, and the previous primary SVM may not even be found.

Figure 4:
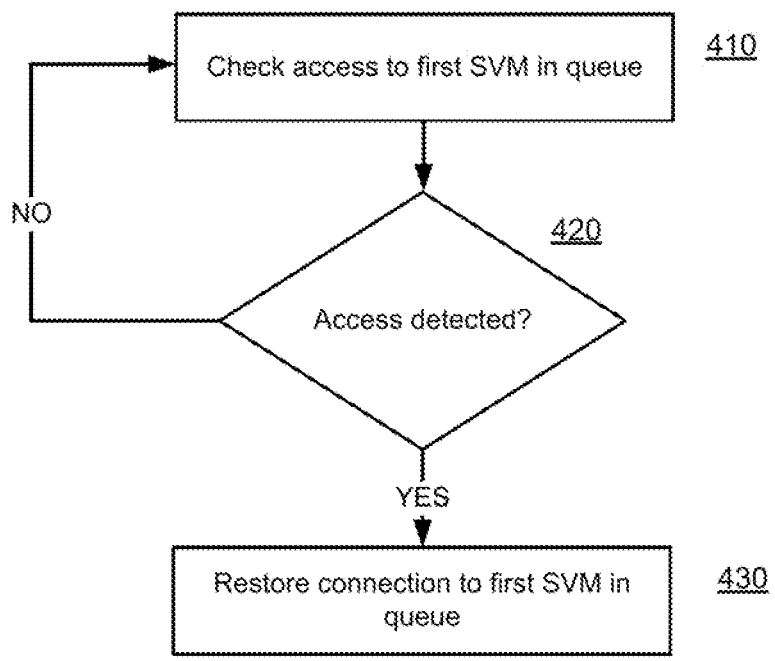
FIG. 4 is a flowchart of an example method of restoration in a system of ensuring fault tolerance of an antivirus system in conditions of a virtual infrastructure.

FIG. 4 shows the operating algorithm of a restoration module in the system of ensuring fault tolerance of an antivirus system in conditions of a virtual environment. The restoration module may be the same as the connection module 270. Since the primary SVM is the SVM with the highest priority for the interaction of the antivirus agent and the antivirus module in the antivirus protection of the VM, after the breaking of the connection with the primary SVM it may be determined to restore the communications. Therefore, after connecting to the next SVM on the list of available SVMs, the connection module 270 in step 410 makes a check of the restoration of the primary SVM. The check includes periodic polling of the primary SVM with the aid of the unique identifier. In this case, if in step 420 communications are restored, the connection module 270 in step 430 disconnects from the temporary SVM and establishes connection with the primary SVM. Otherwise, if no communication is detected, the connection module 270 in step 420 continues the periodic checking of the communications.

Figure 5:
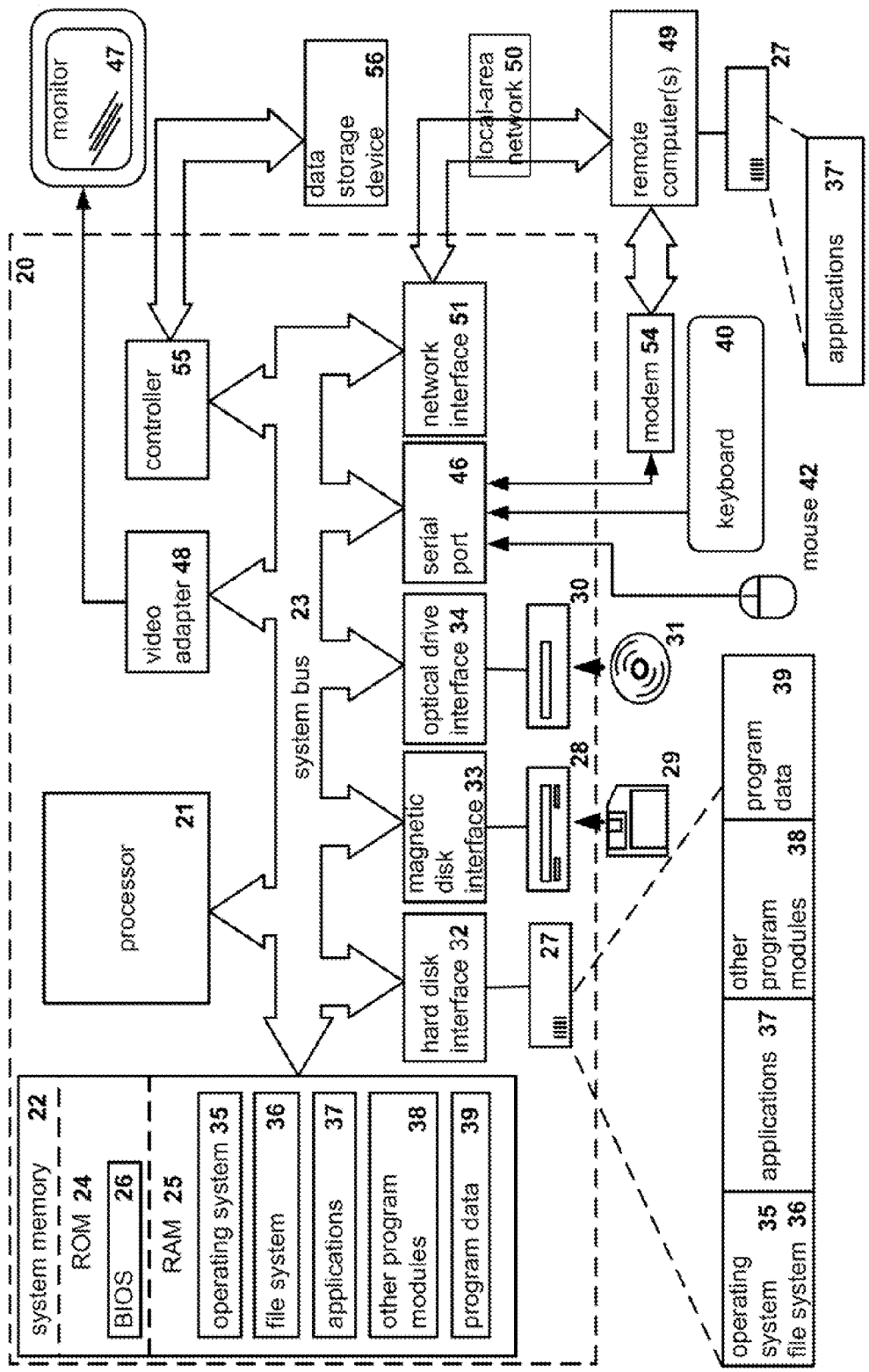
FIG. 5 shows an example of a general-purpose computer system on which aspects of systems and methods for ensuring fault tolerance of an antivirus system in conditions of a virtual infrastructure can be implemented.

FIG. 5 shows an example of a general-purpose computer system (which may be a personal computer or a server) 20, which may be used to implement aspects of system and methods for ensuring fault tolerance of an antivirus system in conditions of a virtual infrastructure disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for antivirus protection of virtual machines, the method comprising:
collecting, by a hardware processor executing a antivirus agent in a virtual machine, information about available security virtual machines that provide at least one or more resource-intensive methods of antivirus checking of programs running on the virtual machine;
analyzing the collected information to determine a location of the virtual machine relative to the security virtual machines and determine priorities for each of the security virtual machines based at least in part on the location of the virtual machine;
forming a list of the available security virtual machines according to the priorities of the security virtual machines to identify a primary security virtual machine having the highest priority on the list, wherein a plurality of non-primary security virtual machines in the list form a block, and wherein each security virtual machine within the block is assigned a numeric weight for selecting according to the assigned weight a security virtual machine within the block as a temporary security virtual machine;
connecting the virtual machine to the primary security virtual machine; and
requesting the primary security virtual machine to perform at least antivirus checking of one or more programs running on the virtual machine; wherein the virtual machine deployed on a physical machine is capable of connecting to a temporary security virtual machine deployed on another physical machine for antivirus checking.

2. The method of claim 1, wherein the information collected about the security virtual machines includes one or more of:
a unique identifier of a hypervisor on which a security virtual machine is installed;
a type of the hypervisor;
a number of virtual machines attended by the security virtual machine; and
an IP address of the security virtual machine.

3. The method of claim 1, wherein determining priorities is further based on one or more of:
availability of first information about a security virtual machine in the virtual machine;
an affiliation of the security virtual machine with a same hypervisor on which the virtual machine is installed;
availability of second information about the virtual machine in the security virtual machine;
a type of a hypervisor on which the security virtual machine is operating;
a busy status of the security virtual machine determined based on a first number of virtual machines connected to the security virtual machine and computing resources allocated to the security virtual machine.

4. The method of claim 1, wherein connecting the virtual machine to the primary security virtual machine further includes:
determining that a successful connection is established with the primary security virtual machine;
storing a unique identifier of the primary security virtual machine; and
monitoring a status of the successful connection.

5. The method of claim 1, wherein connecting the virtual machine to the primary security virtual machine further includes:
determining that a successful connection is established not with the primary security virtual machine but with a different security virtual machine on the list of the security virtual machines;
performing a repeat attempt to connect to the primary security virtual machine; and
if the repeat attempt fails:
connecting to the different security virtual machine; and
storing a unique identifier of the different security virtual machine as a new primary security virtual machine for the virtual machine.

6. The method of claim 1, wherein connecting the virtual machine to the primary security virtual machine further includes:
- determining a failure in a connection to the primary security virtual machine;
- determining whether the list of the security virtual machines is up to date based on a time of a last updating of the list of the security virtual machines;
- if the list of the security virtual machines is not up to date, updating the list of the security virtual machines; and
- attempting to connect to the security virtual machines according to the list of the security virtual machines until a successful connection is established with the primary security virtual machine or until a new primary security virtual machine is identified.

7. The method of claim 1, further comprising:
- maintaining the list of the security virtual machines up to date by periodically repeating the collecting, the analyzing, and the forming.

8. The method of claim 7, further comprising:
- determining a failure in a connection to the primary security virtual machine; and
- attempting to connect to the security virtual machines according to the list of the security virtual machines until a successful connection is established with the primary security virtual machine or until a new primary security virtual machine is identified.

9. A system for antivirus protection of virtual machines, the system comprising:
- a processor running on a virtual machine, the processor being configured to:
  - collect, by the virtual machine, information about available security virtual machines that provide at least one or more resource-intensive methods of antivirus checking of programs running on the virtual machine;
  - analyze the collected information to determine a location of the virtual machine relative to the security virtual machines and determine priorities for each of the security virtual machines based at least in part on the location of the virtual machine;
  - form a list of the available security virtual machines according to the priorities of the security virtual machines to identify a primary security virtual machine having the highest priority on the list, wherein a plurality of non-primary security virtual machines in the list form a block, and wherein each security virtual machine within the block is assigned a numeric weight for selecting according to the assigned weight a security virtual machine within the block as a temporary security virtual machine;
  - connect the virtual machine to the primary security virtual machine; and
  - request the primary security virtual machine to perform at least antivirus checking of one or more programs running on the virtual machine; wherein the virtual machine deployed on a physical machine is capable of connecting to a temporary security virtual machine deployed on another physical machine for antivirus checking.

10. The system of claim 9, wherein the information collected about the security virtual machines includes one or more of:
- a unique identifier of a hypervisor on which a security virtual machine is installed;
- a type of the hypervisor;
- a number of virtual machines attended by the security virtual machine; and
- an IP address of the security virtual machine.

11. The system of claim 9, wherein determining priorities is further based on one or more of:
- availability of first information about a security virtual machine in the virtual machine;
- an affiliation of the security virtual machine with a same hypervisor on which the virtual machine is installed;
- availability of second information about the virtual machine in the security virtual machine;
- a type of a hypervisor on which the security virtual machine is operating; and
- a busy status of the security virtual machine determined based on a first number of virtual machines connected to the security virtual machine and computing resources allocated to the security virtual machine.

12. The system of claim 9, wherein the processor is configured to connect the virtual machine to the primary security virtual machine by:
- determining that a successful connection is established with the primary security virtual machine;
- storing a unique identifier of the primary security virtual machine; and
- monitoring a status of the successful connection.

13. The system of claim 9, wherein the processor is configured to connect the virtual machine to the primary security virtual machine by:
- determining that a successful connection is established not with the primary security virtual machine but with a different security virtual machine on the list of the security virtual machines;
- performing a repeat attempt to connect to the primary security virtual machine; and
- if the repeat attempt fails:
  - connecting to the different security virtual machine; and
  - storing a unique identifier of the different security virtual machine as a new primary security virtual machine for the virtual machine.

14. The system of claim 9, wherein the processor is configured to connect the virtual machine to the primary security virtual by:
- determining a failure in a connection to the primary security virtual machine;
- determining whether the list of the security virtual machines is up to date based on a time of a last updating of the list of the security virtual machines;
- if the list of the security virtual machines is not up to date, updating the list of the security virtual machines; and
- attempting to connect to the security virtual machines according to the list of the security virtual machines until a successful connection is established with the primary security virtual machine or until a new primary security virtual machine is identified.

15. The system of claim 9, wherein the processor is further configured to:
- maintain the list of the security virtual machines up to date by periodically repeating the collecting, the analyzing, and the forming.

16. The system of claim 15, wherein the processor is further configured to:
- determine a failure in a connection to the primary security virtual machine; and
- attempt to connect to the security virtual machines according to the list of the security virtual machines until a successful connection is established with the primary security virtual machine or until a new primary security virtual machine is identified.

17. A computer program product stored on a non-transitory computer-readable storage medium, the computer program product comprising computer-executable instructions for antivirus protection of virtual machines, including instructions for:

collecting, by a virtual machine, information about available security virtual machines that provide at least one or more resource-intensive methods of antivirus checking of programs running on the virtual machine;

analyzing the collected information to determine a location of the virtual machine relative to the security virtual machines and determine priorities for each of the security virtual machines based at least in part on the location of the virtual machine;

forming a list of the available security virtual machines according to the priorities of the security virtual machines to identify a primary security virtual machine having the highest priority on the list, wherein a plurality of non-primary security virtual machines in the list form a block, and wherein each security virtual machine within the block is assigned a numeric weight for selecting according to the assigned weight a security virtual machine within the block as a temporary security virtual machine;

connecting the virtual machine to the primary security virtual machine; and requesting the primary security virtual machine to perform at least antivirus checking of one or more programs running on the virtual machine; wherein the virtual machine deployed on a physical machine is capable of connecting to a temporary security virtual machine deployed on another physical machine for antivirus checking.

18. The computer program product of claim 17, wherein connecting the virtual machine to the primary security virtual machine further includes:

determining that a successful connection is established with the primary security virtual machine;

storing a unique identifier of the primary security virtual machine; and monitoring a status of the successful connection.

19. The computer program product of claim 17, wherein connecting the virtual machine to the primary security virtual machine further includes:

determining that a successful connection is established not with the primary security virtual machine but with a different security virtual machine on the list of the security virtual machines;

performing a repeat attempt to connect to the primary security virtual machine; and if the repeat attempt fails:

connecting to the different security virtual machine; and storing a unique identifier of the different security virtual machine as a new primary security virtual machine for the virtual machine.

20. The computer program product of claim 17, wherein connecting the virtual machine to the primary security virtual machine further includes:

determining a failure in a connection to the primary security virtual machine;

determining whether the list of the security virtual machines is up to date based on a time of a last updating of the list of the security virtual machines;

if the list of the security virtual machines is not up to date, updating the list of the security virtual machines; and attempting to connect to the security virtual machines according to the list of the security virtual machines until a successful connection is established with the primary security virtual machine or until a new primary security virtual machine is identified.

\* \* \* \* \*